United States Patent Office 3,505,345
Patented Apr. 7, 1970

3,505,345
METHOD OF PREPARING ISOCINCHOMERONIC ACID
Ronald Harmetz, Dover, and George G. Hazen, Westfield, N.J., assignors to Merck & Co., Inc., Rahway, N.J., a corporation of New Jersey
No Drawing. Continuation-in-part of application Ser. No. 684,621, Nov. 21, 1967. This application June 10, 1969, Ser. No. 832,028
Int. Cl. C07d 31/38
U.S. Cl. 260—295.5                                1 Claim

ABSTRACT OF THE DISCLOSURE

An improved method for preparing isocinchomeronic acid by the nitric acid oxidation of 5-ethyl-2-methylpyridine in the presence of sufficient ferric nitrate to form a soluble complex of ferric isocinchomeronate which, upon cooling, yields the free acid.

CROSS-REFERENCE TO RELATED APPLICATION

This is a continuation-in-part of our pending application Ser. No. 684,621, filed Nov. 21, 1967, now abandoned.

BACKGROUND OF THE INVENTION

Field of the invention

Improved process for preparing isocinchomeronic acid.

Description of the prior art

Isocinchomeronic acid is a potentially important chemical intermediate. Its use has been suggested in dyeing, for example, for the manufacture of vat dyes which will not harm the fiber. It can also be decarboxylated to nicotinic acid. For this latter purpose, high purity is desirable.

Isocinchomeronic acid can be prepared by oxidation of 5-ethyl-2-methylpyridine with concentrated nitric acid at elevated temperatures and under pressure. Similarly, isocinchomeronic acid can be prepared by the oxidation of 5-ethyl-2-methylpyridine with nitric acid at elevated temperatures and under pressure in the presence of metal salts such as copper, zinc, and nickel, as described in U.S. Patent No. 2,657,207. In accordance with this process, however, the product obtained is an insoluble metal salt of isocinchomeronic acid which must be heated with an alkali to separate the metal salt from the acid, and the isocinchomeronic acid thus obtained must be further treated with a strong inorganic acid to insure that all the carboxylic acid is present as free acid. This process, although providing high yields of the acid, is inefficient and costly from a process point of view because of the necessity of chemically treating the reaction product to separate the free acid from the metal salt, and also because the metal salt used is separated as an oxide and thus requires further treatment to convert it to the nitrate for reuse; or if reused as the oxide, additional amounts of nitric acid are necessary in the process.

U.S. Patent No. 2,884,415 discloses a method for preparing a mixture of isocinchomeronic acid and niacin by the nitric acid oxidation of 5-ethyl-2-methylpyridine at temperatures between 250° and 350° C. and under pressure, employing minor amounts of a soluble salt of iron as the catalyst. The main disadvantage of this process is that it is difficult to separate the desired isocinchomeronic acid from the mixture of niacin and isocinchomeronic acid produced.

SUMMARY OF THE INVENTION

It is an object of the present invention to provide an improved process for the preparation of isocinchomeronic acid in excellent yields and substantially free of niacin. Another object of this invention is to provide a process for the preparation of isocinchomeronic acid directly in crystalline form. Other objects will be apparent from the detailed description of our invention hereinafter provided.

DESCRIPTION OF THE PREFERRED EMBODIMENTS

The improved process of the present invention comprises carrying out the nitric acid oxidation of 5-ethyl-2-methylpyridine in the presence of sufficient ferric ions to form an iron complex with the isocinchomeronic acid and then isolating the free acid directly from the resulting reaction mixture. The presence of ferric ions during the oxidation reaction is essential to the invention in that it permits the immediate formation of a soluble complex between the ferric ions and the carboxy groups of the isocinchomeronic acid. The formation of the soluble iron complex thus acts to stabilize and inhibit the decomposition of isocinchomeronic acid, which under the reaction conditions otherwise tends to decarboxylate to form niacin unless the carboxy groups are protected in the manner as provided by our invention. The character of the complex formed during the reaction period is of such a nature that upon cooling it disassociates, yielding its components, isocinchomeronic acid and ferric nitrate. Thus, the formation of the iron complex intermediates during the reaction according to our process not only provides for a process which insures high yields of the desirable isocinchomeronic acid, but permits the easy separation of isocinchomeronic acid from the complexing metal, and the metal so separated can be recovered and reused.

Thus, in accordance with our invention, 5-ethyl-2-methylpyridine is oxidized in the presence of sufficient ferric ions to form the desired complex at elevated temperatures in a closed vessel. The isocinchomeronic acid formed thereby immediately complexes with the ferric ions, forming a complex which is soluble in the reaction mixture and which, upon cooling or diluting, precipitates the free isocinchomeronic acid. The isocinchomeronic acid thus precipitated can then be recovered in the substantially pure form by simple filtration. The ferric nitrate remaining in solution can be recovered and reused in the process.

In carrying out the oxidation reaction, nitric acid in a concentration of about 10–80% dilution can be used. The amount of nitric acid used will range from about 6 to 9 moles of nitric acid per mole of 5-ethyl-2-methylpyridine present; however, it is preferable to use a mole ratio of about 7:1. The reaction is carried out at elevated temperatures, usually being initiated at about 155–185° C., and preferably at about 165° C. Temperatures above 250° C. should be avoided as decomposition of the isocinchomeronic acid may occur notwithstanding the stabilizing effect afforded by the iron complex. The reaction should be carried out in a closed vessel capable of withstanding pressure since the evolution of nitric oxides will cause a buildup of pressure during the oxidation process. A convenient pressure at which this reaction may therefore be effected is about 650–750 p.s.i., preferably about 700 p.s.i.

In order to form the iron complex which is a critical feature of this invention, the presence of a compound capable of yielding ferric ions in the aqueous reaction mixture is necessary. The most suitable compound for accomplishing this is ferric nitric, although ferric oxide or sulfate, or ion dissolved in nitric acid could also be used. Desirably, an excess of ferric ion is used over that theoretically required to supply sufficient ferric ions to form the soluble ferric complex of isocinchomeronic acid.

Although the use of 0.67 mole of ferric nitrate per mole of 5-ethyl-2-methylpyridine will satisfy the stoicheometry of the reaction, we have found that the iron complex of isocinchomeronic acid may be satisfactorily formed by utilizing from about 0.67 to 1.5 moles of ferric nitrate per mole of 5-ethyl-2-methylpyridine, a 1:1 mole ratio being preferred.

In order to further illustrate this invention, but without being limited thereto, the following examples are given.

EXAMPLE 1

Preparation of ferric isocinchomeronate and then isocinchomeronic acid 93.3 grams (1.02 moles) of 68.6 weight percent nitric acid, 20.0 g. (0.165 mole) of 5-ethyl-2-methylpyridine, 44.4 g. (0.11 mole) of ferric nitrate nonahydrate and 62.0 ml. (3.45 moles) of water are charged to one-liter stirred pressure reactor. The reaction mixture is heated until the temperature reaches 160–165° C., at which time an exothermic reaction takes place, causing the temperature to reach about 210° C. The reaction mixture is then allowed to cool gradually to approximately 185° C. and then rapidly cooled to 45° C. The reactor is discharged and the reaction mixture washed with 4×75 ml. and then 1×400 ml. of water. The water washes are combined and concentrated under reduced pressure to about a 200 ml. volume. The initial reactor discharge and the concentrated washes are then combined and aged at 0.5 C. for approximately 60 hours, causing the isocinchomeronic acid to precipitate from solution. Both the solution and the reaction mixture are then filtered, and the solid isocinchomeronic acid which results is washed with 300 ml. of water and air-dried at 90–95° C. to a constant weight. 17.8 grams of isocinchomeronic acid are obtained, having a purity of 97.8%. The filtrate contains 5.7 g. of isocinchomeronic acid, thus making the overall yield and conversion of 5-ethyl-2-methylpyridine to isocinchomeronic acid about 83.7 to 84.3%.

EXAMPLE 2

The following shows the yields of isocinchomeronic acid obtained using varying amounts of reagents according to the procedure of Example 1.

| | Moles | | | | | | |
|---|---|---|---|---|---|---|---|
| $Fe(NO_3)_3 9H_2O$ | 5-ethyl-2-methyl-pyridine | $HNO_3$ | $H_2O$ | Temp., °C. | Time (min.) | Yield, a I.C.¹ | Percent niacin |
| .110 | .165 | 1.016 | 5.09 | 160–210 | 5 | 84 | 3 |
| .167 | .165 | 1.016 | 9.82 | 190–195 | 5 | 85 | 1 |
| .1112 | .167 | 1.349 | 6.15 | 180–190 | 8 | 85 | 1 |
| .365 | .165 | | 14.7 | 160–170 | 220 | 64 | 4 |
| 0 | .165 | 1.016 | 6.09 | 196–197 | 5 | 40 | 33 |
| 0 | .167 | 1.349 | 6.61 | 190–205 | 5 | 49 | 24 |

¹ a I.C.=isocinchomeronic acid.

What is claimed is:

1. In a process for preparing isocinchomeronic acid by the nitric acid oxidation of 5-ethyl-2-methylpyridine at a temperature of 155 to 250° C., the improvement which comprises carrying out the oxidation in the presence of 0.67 to 1.5 moles of ferric ions per mole of 5-ethyl-2-methylpyridine, cooling the resulting reaction mixture and recovering the precipitated isocinchomeronic acid.

References Cited

UNITED STATES PATENTS 2,657,207   10/1953   Herring _____ 260—270
2,884,415    4/1959   Abraham et al. _____ 260—295.5

HENRY R. JILES, Primary Examiner

A. L. ROTMAN, Assistant Examiner